United States Patent
Boldon

(10) Patent No.: US 7,145,682 B2
(45) Date of Patent: Dec. 5, 2006

(54) TEMPORARY PRINTER FIRMWARE UPGRADE

(75) Inventor: John L. Boldon, Emmett, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 774 days.

(21) Appl. No.: 10/324,426

(22) Filed: Dec. 20, 2002

(65) Prior Publication Data

US 2004/0120001 A1 Jun. 24, 2004

(51) Int. Cl.
*G06F 15/177* (2006.01)

(52) U.S. Cl. .................. 358/1.15; 710/10; 717/168

(58) Field of Classification Search .................. None
See application file for complete search history.

(56) References Cited

U.S. PATENT DOCUMENTS

| | | | | |
|---|---|---|---|---|
| 5,050,098 A | * | 9/1991 | Brown et al. | 358/1.13 |
| 5,652,019 A | * | 7/1997 | Moran | 427/226 |
| 6,433,884 B1 | * | 8/2002 | Kawakami | 358/1.15 |
| 6,681,392 B1 | * | 1/2004 | Henry et al. | 717/176 |

* cited by examiner

*Primary Examiner*—Mark Zimmerman
*Assistant Examiner*—Jacob P. Rohwer

(57) ABSTRACT

Systems and methods are described herein for utilizing a temporary firmware update for a printing device. A user of a shared printing device who desires to utilize a different version of printing device firmware than presently resides in the printing device submits temporary firmware with a print job. The temporary firmware is loaded into the printing device prior to the printing device processing the print job. When the print job is complete, the newly installed temporary firmware is deleted from the printing device and control is restored to the original firmware.

35 Claims, 4 Drawing Sheets

TEMPORARY PRINTER FIRMWARE UPGRADE

TECHNICAL FIELD

The systems and methods described herein generally relate to printing device firmware. More particularly, the systems and methods described herein relate to temporarily upgrading firmware in a printing device.

BACKGROUND

Large enterprises that maintain several printing devices are sometimes slow to adopt or qualify new versions of firmware for the printing devices. For various reasons, an individual within the enterprise may desire to upgrade to a new version of a printing device driver before others using the same printing device are allowed to upgrade. If the printing device is upgraded before user computers are also updated, then compatibility problems will arise within the enterprise.

Furthermore, when a new version of printing device firmware is approved and made available, upgrades to printing devices and computer that utilize the printing devices can be slow and sequential. There is typically a lag between the time one or more printing devices receive firmware upgrades and the time that each computer using the printing devices gets an updated driver. During this period, compatibility problems can also arise.

SUMMARY

Systems and methods are described herein for temporarily upgrading printing device firmware. A printing device user may utilize a new or different version of the firmware in the printing device without affecting other users of the same printing device and without having to wait for enterprise approval to upgrade to the user's requirements. When the user submits a print job to the printer, a temporary version of the printing device's new firmware is downloaded together with a print job to be processed. The printing device copies the firmware image into printing device memory and uses the new image to process the associated print job. When processing is complete, the printing device deletes the newly received firmware and resumes operation utilizing the original firmware.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
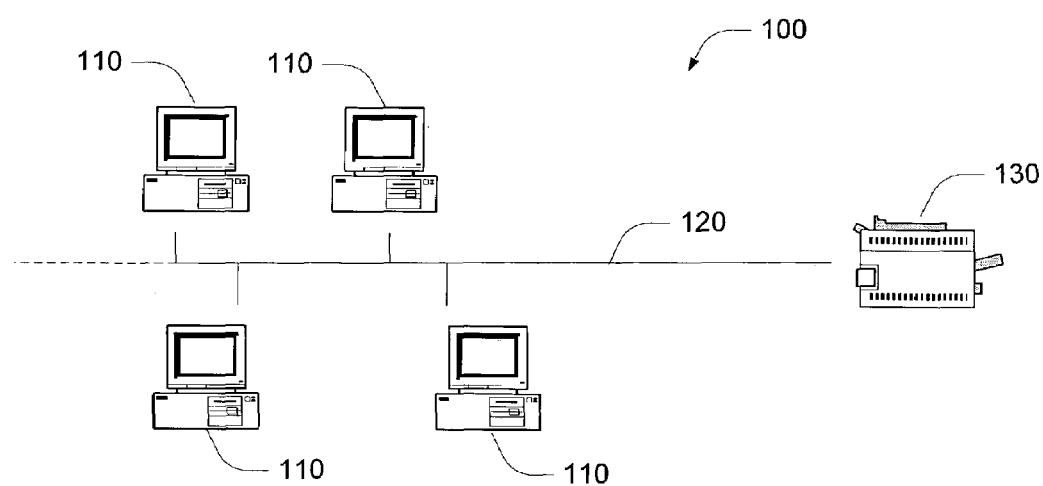
FIG. 1 is an illustration of multiple computers and a printing device on a network.

The following description sets forth one or more specific implementations and/or embodiments of systems and methods for temporarily upgrading printing device firmware. The systems and methods incorporate elements recited in the appended claims. These implementations are described with specificity in order to meet statutory written description, enablement, and best-mode requirements. However, the description itself is not intended to limit the scope of this patent.

Also described herein are one or more exemplary implementations of systems and methods for temporarily upgrading printing device firmware. Applicant intends these exemplary implementations to be examples only. Applicant does not intend these exemplary implementations to limit the scope of the appended claims. Rather, Applicant has contemplated that the claimed systems and methods might also be embodied and implemented in other ways, in conjunction with other present or future technologies.

Computer-Executable Instructions

An implementation of a system and/or method for temporarily upgrading printing device firmware may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer-Readable Media

An implementation of a system and/or method for temporarily upgrading printing device firmware may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile/video disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer-readable instructions, data structures, program modules, or other data in a modulated data signal, such as carrier wave or other transport mechanism. Communication media also includes any information delivery media.

Methods, printing systems, printing devices and computer-readable media, according to various implementations, relate to temporarily upgrading printing device firmware. A printing device, as used herein, means any device that applies a printing material to one or more types of print media, such as a laser printer, an inkjet printer, a dry material printer, a copier, a facsimile machine, a plotter, and the like.

When a user of a shared printing device desires to take advantage of new firmware available for the printing device, but the printing device firmware cannot be upgraded permanently, the user stores a printing device driver and the new printing device firmware in a user computer. The printing device driver is configured to download the new printing device firmware with each print job submitted from the computer. Alternatively, the user may be prompted before each print job as to whether the user wishes to utilize the new or existing printing device firmware.

If the user chooses to utilize the new printing device firmware, a print job packet is created that includes the print job data, the new printing device firmware, and an indicator used to communicate to the printer that the print job packet contains print job data and new firmware. When the printing device receives a print job that includes the indicator, the printing device loads the new firmware. In one implementation, only particular firmware modules that differ from the existing firmware modules are loaded. The existing firmware and/or modules are retained.

The print job is extracted from the print job packet and the print job is performed utilizing the new printing device firmware. Thereafter, the printing device deletes the newly loaded firmware and/or firmware modules and continues to operate as before, with the original printing device firmware.

Thus, a user who may be experiencing problems with present firmware can take advantage of new firmware that may solve the user's problem. Or, the user may benefit from new features included in new firmware that is not included in the existing firmware. For any reason the user may desire to utilize the new printing device firmware, the user can do so without disrupting printing by other users of the printing device.

Exemplary Environment

FIG. 1 is an illustration of a distributed network environment 100 in which the present concepts may be implemented. The environment 100 includes multiple computers 110 connected to a network 120. A shared printing device 130 is also connected to the network, enabling the multiple computers 110 to print from the printing device.

It is noted that although only four computers 110 are shown in FIG. 1, there may be from one to any practical number of computers 110 connected to the network 120. Likewise, although only one printing device 130 is shown connected to the network 120, there may be more than one printing devices 130 connected to the network.

The following described implementations may be implemented in the printing device 130 and one or more of the computers 110 connected to the network 120.

Exemplary Printing System

Figure 2:
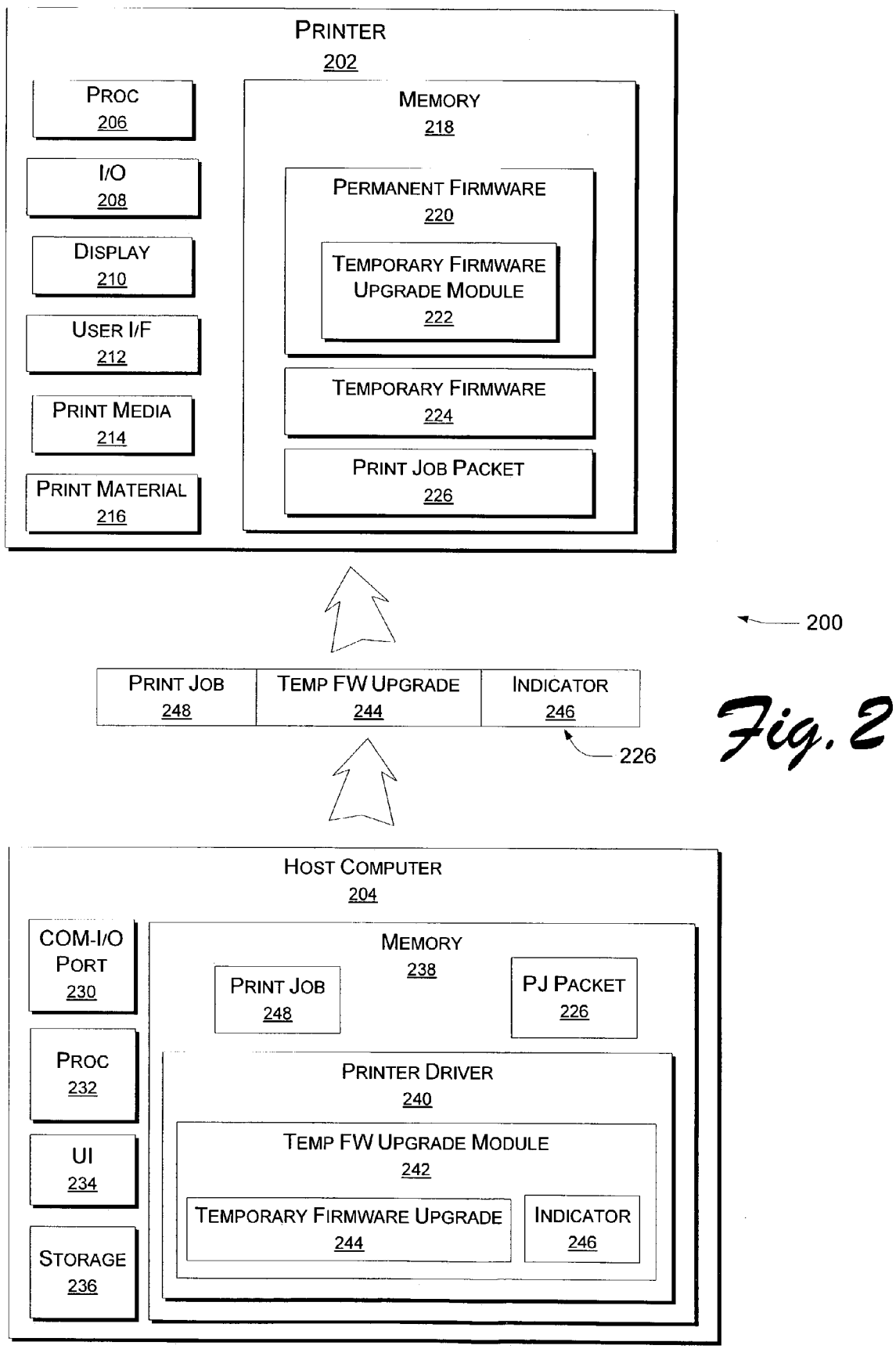
FIG. 2 is a block diagram of an exemplary printing system.

FIG. 2 is a block diagram of an exemplary printing system 200. The printing system includes a printer 202 and a host computer 204. Although a printer 202 is shown in FIG. 2, it is noted that any printing device may be utilized in the described implementation without departing from the scope of the concepts described herein.

The printer 202 includes a processor 206, an input/output (I/O) port 208 for communicating with the host computer 204 and/or a network (not shown), a display 210, and a user interface 212 that may be a keypad or a software-based user interface that is shown on the display 210 (which may be a touch sensitive display). The printer 202 includes one or more print media 214 (e.g. paper, transparencies, etc.) and one or more print materials 216. The print material 216 may be any type of print material designed to be applied to the print media 214 to form characters on the print media 214, such as laser printer toner, ink-jet printer ink, dry material (ribbon, powder, etc.), plotter pens, and the like. Other components typically found in printers to render them operational are assumed to be included in the printer 202, but are not shown in FIG. 2 due to size considerations.

The printer 202 also includes printer memory 218 that stores permanent firmware 220 that controls operation of the printer 202. In the present example, the permanent firmware 220 includes a temporary firmware upgrade module 222 that controls detection, loading and deleting of temporary firmware 224 stored in the printer memory 218. Also shown stored in the printer memory 218 is a print job packet 226, which will be described in greater detail below.

The host computer 204 is connected to the printer 202 by any means known in the art, such as a parallel cable, a serial cable, a Universal Serial Bus (USB) cable, an infrared (IR) connection, a network interface card (NIC), etc. The host computer 204 includes a communications/input/output (COM-I/O) port 230 to facilitate this functionality.

The host computer 204 also includes a processor 232, a user interface 234 and mass storage 236, such as a hard disk drive or the like. Other components typically found in a computer are assumed to be included in the host computer 204, although not all are shown. The host computer 204 also includes computer memory 238 that stores a printer driver 240 designed to operate in conjunction with the printer 202. The printer driver 240 includes a temporary firmware upgrade module 242 that has a temporary firmware upgrade 244 and an indicator 246 included therein.

The computer memory 238 is shown storing a print job 248 that is a part of the print job packet 226 shown in the computer memory 238 as well as the printer memory 218. As shown and described herein, the print job packet 226 is duplicated in two or more places. However, it is noted that the print job packet 226 may only be located in one of said places at any given time.

The host computer 204, by virtue of the temporary firmware upgrade module 242 contained therein, is configured to transmit the print job packet 226 over a connection to the printer 202. The print job packet 226 includes at least the print job 248, the temporary firmware upgrade 244 and the indicator 246. Other implementations may include more data in the print job packet 226. Likewise, at least one implementation may not require the indicator 246 in the event that the permanent firmware 220 in the printer 202 is configured to automatically recognize—without an indicator—a print job that requires a temporary firmware upgrade.

When the host computer 204 prepares to transmit the print job 248 to the printer 202, the temporary firmware upgrade module 242 creates the print job packet 226 by attaching the temporary firmware upgrade 244 to the print job 248. The indicator 246 is also attached to the print job packet 226 to notify the printer 202 that new firmware must be loaded before the print job 248 is processed.

The print job packet 226 is transmitted to the printer 202 via a direct connection or a network connection. When the printer 202 receives the print job packet 226, the temporary firmware upgrade module 222 in the permanent firmware 220 detects the presence of the indicator 226 in the print job packet 226. The temporary firmware upgrade module 222 then extracts the temporary firmware upgrade 244 from the print job packet 226 and stores the temporary firmware upgrade 244 in the printer memory 218 as the temporary firmware 224. In an alternative implementation, the temporary firmware upgrade 244 is not the complete new version of firmware. Instead, the temporary firmware upgrade 244 includes only particular firmware modules that are different between the permanent firmware 220 version and the temporary firmware upgrade 244 version.

Once the temporary firmware 224 is loaded in the printer 202, the print job 248 is processed by the printer 202. When the print job 248 is complete, the temporary firmware upgrade module 222 deletes the temporary firmware 224 from the printer memory 218 and the printer 202 is restored to operation with the permanent firmware 220.

In another implementation, the temporary firmware upgrade module 222 is not present in the permanent firmware 220, but is transmitted with the print job packet 226 and includes instructions to the printer 202 that are executed before the printer 202 attempts to execute the print job 248. After the first execution of the temporary firmware upgrade module 222, certain code may remain in the printer memory 218 so that the temporary firmware upgrade module 222 will not have to be reloaded in the future.

Methodological Implementation: Temp. FW Upgrade: Computer

Figure 3:
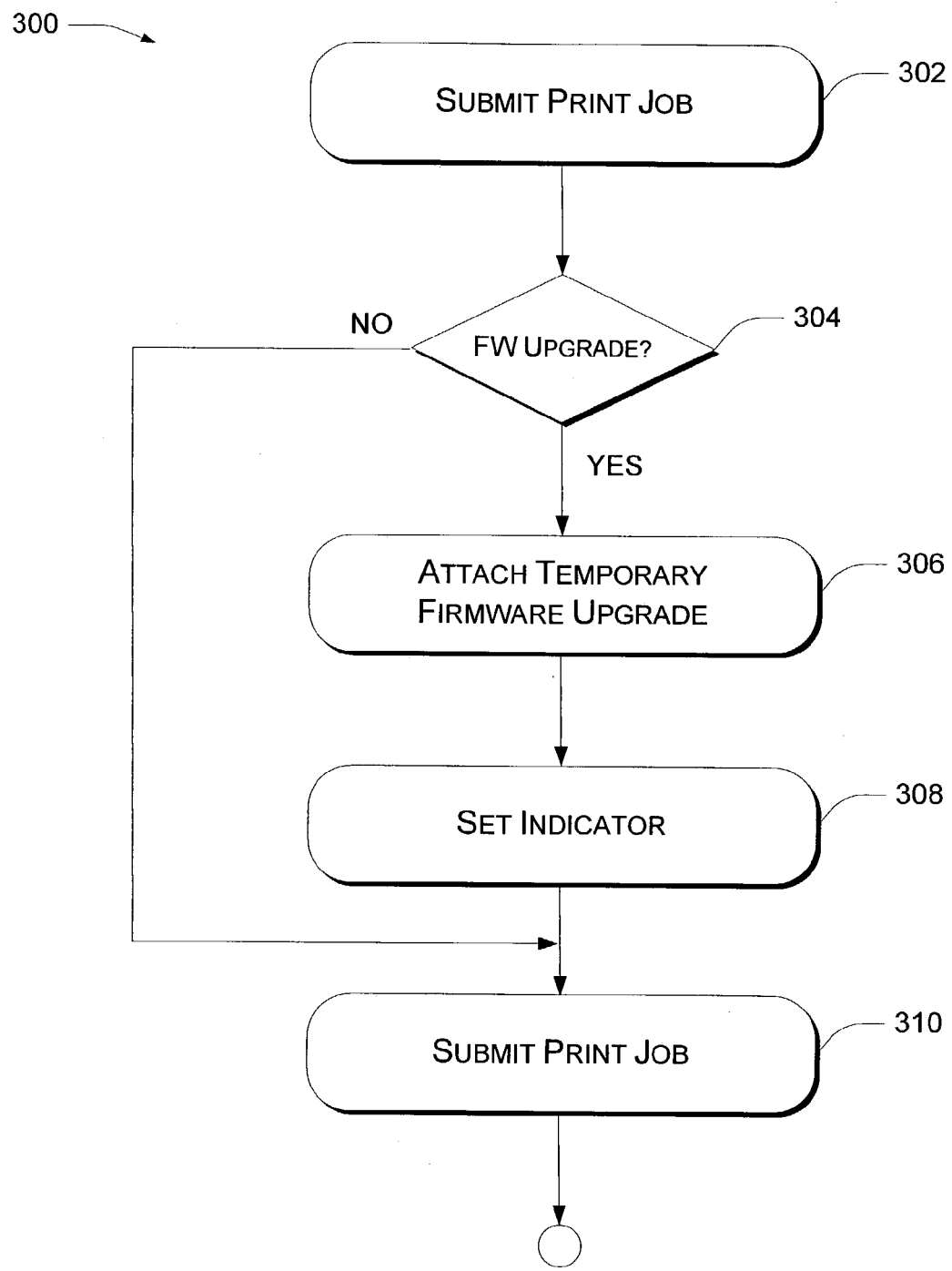
FIG. 3 is a flow diagram depicting a methodological implementation on a host computer of temporarily upgrading printing device firmware.

FIG. 3 is a flow diagram depicting but one implementation of a methodological implementation 300 of temporarily upgrading firmware in a printing device. In the following discussion, continuing reference will be made to the elements and reference numerals shown in FIG. 2. The methodological implementation shown in FIG. 3 describes a process carried out in the host computer 204.

At block 302, the print job 248 is submitted to a printer by the host computer 204. If the print job 248 is to utilize a different version of firmware than is presently included in the printer 202 ("Yes" branch, block 304) then the temporary firmware upgrade module 242 in the host computer 204 attaches the temporary firmware upgrade 244 to the print job 248 (as indicated at block 306). The indicator 246 is set at block 308 by attaching the indicator 246 to the print job 248 and the temporary firmware upgrade 244 to form the print job packet 226. The print job packet 226 is then submitted to the printer 202 at block 310.

If the print job 248 is able to utilize the permanent firmware 220 present in the printer ("No" branch, block 304), then the print job 248 is simply submitted normally.

There are several ways in which the host computer 204 can determine if the print job 248 is to utilize the permanent firmware 220 stored in the printer memory 218 or not. In one implementation, as part of a print job submission process, the printer driver 240 prompts a user via the user interface 234 as to whether the user desires to use the permanent firmware 220 or not. The user may then indicate a preference for the permanent firmware 220 or the temporary firmware upgrade 244.

A drawback to this implementation is that the user is required to take an action in addition to the normal printing process. To resolve this problem, the printer driver 240 may include a feature with which the user can enable and disable the temporary firmware upgrade module 242.

In another implementation, the printer driver 240 is configured to automatically detect a version of the permanent firmware 220 used in the printer 202. The printer driver 240 then enables the temporary firmware upgrade module 242 if the detected version of permanent firmware 220 is different from the version embodied by the temporary firmware upgrade 244. The temporary firmware upgrade module 242 then carries out the process to utilize the temporary firmware upgrade 244 in the printer 202.

A problem with this particular implementation may be that the user may not always need to supplant the permanent firmware 220, but only desires to do so with certain print jobs, such as print jobs that include special features such as intense graphics. Providing user control over the temporary firmware upgrade feature can overcome this particular problem.

Methodological Implementation: Temporary FW Upgrade: Printer

Figure 4:
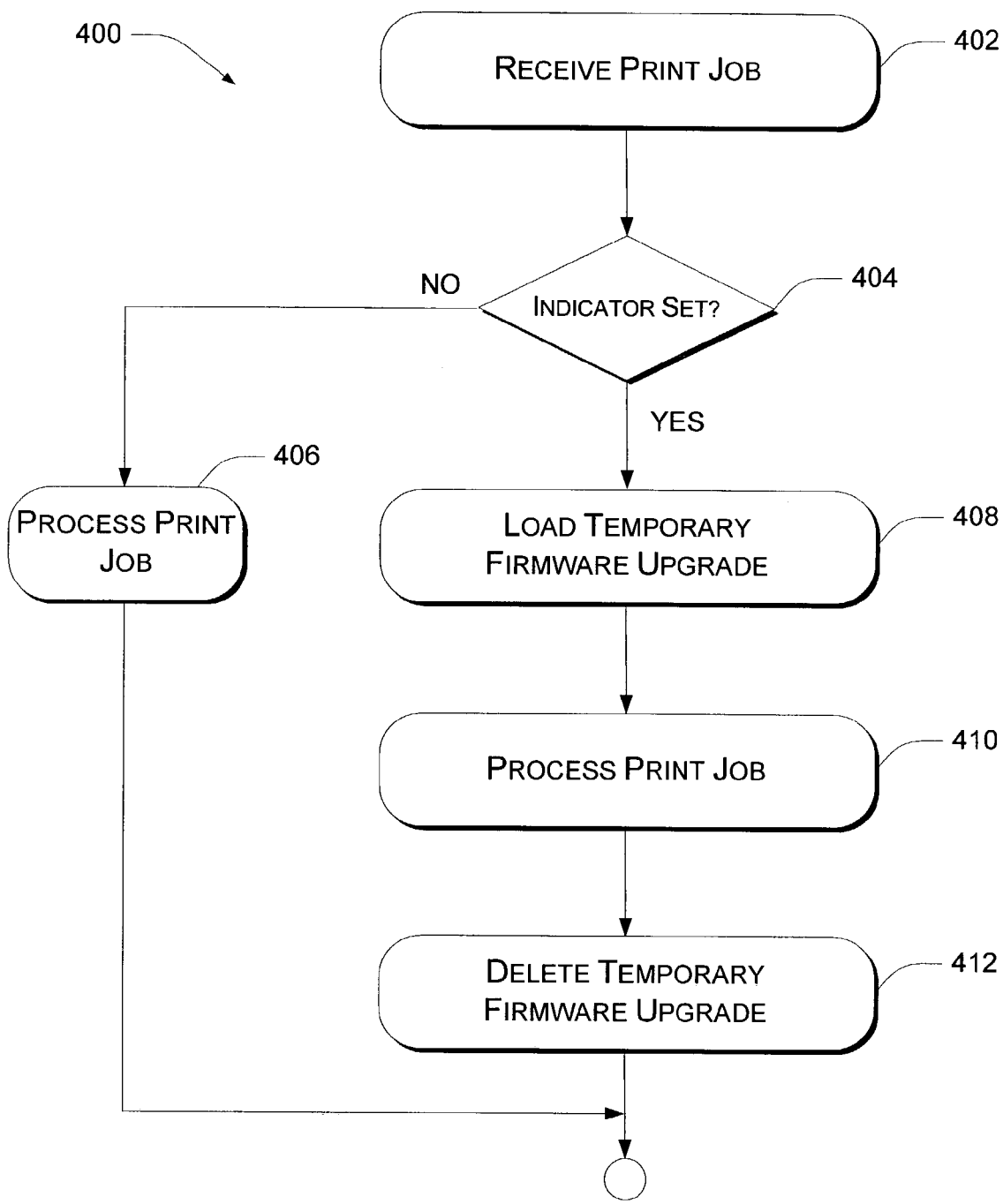
FIG. 4 is flow diagram depicting a methodological implementation on a printing device of temporarily upgrading printing device firmware.

FIG. 4 is a flow diagram depicting but one implementation of a methodological implementation 400 of temporarily upgrading firmware in a printing device. In the following discussion, continuing reference will be made to the elements and reference numerals shown in FIG. 2. The methodological implementation shown in FIG. 4 describes a process carried out in the printer 202.

At block 402, the printer 202 receives the print job packet 226 from the host computer 204. At this point, the printer 202 is not aware if the received job is a typical print job or a print job packet 226. The temporary firmware upgrade module 222 examines the print job packet 226 to determine if the indicator 246 is present (block 404). If the indicator 246 is not detected ("No" branch, block 404), then the print job 248 is processed at block 406.

If the indicator 246 is detected ("Yes" branch, block 406), then the temporary firmware upgrade module 222 loads the temporary firmware upgrade 244 at block 408. At block 410, the printer 202 processes the print job 248 using the temporary firmware 224. When the print job 248 is complete, the temporary firmware upgrade module 222 deletes the temporary firmware 224 (block 412) and the printer 202 resumes operation under the control of the previously used firmware 220.

As previously discussed, the temporary firmware upgrade 244 may include an entire version of printer firmware or just particular firmware modules that have been updated from a current version of firmware. If only particular modules have been updated, then those modules are loaded before the print job is processed. Afterward, only those particular modules are deleted from the printer memory 218. Cutting and pasting of individual modules may require some risk that some of the current firmware 220 may be unintentionally deleted. However, downloading an entire firmware version with each print job may require more resources than is desirable. These are considerations that may be taken into account when designing a particular implementation.

CONCLUSION

Implementation of the systems and methods described herein provide a way for an individual user to load and utilize a different version of printing device firmware than is presently installed on a shared printing device. The user can enable desirable features contained in the different version of the firmware while allowing other printing device users to continue their use of the printing device without interruption or nuisance.

Although the systems and methods have been described in language specific to structural features and/or methodological steps, it is to be understood that the systems, methods and articles of manufacture defined in the appended claims are not necessarily limited to the specific features or steps described. Rather, the specific features and steps are disclosed as particular forms of implementing the claimed systems, methods and articles of manufacture.

The invention claimed is:

1. A method, comprising:
receiving a command to submit a print job to a printing device; and transmitting the print job to the printing device together with printing device firmware for the printing device;
wherein the printing device firmware is intended to be removed after the print job is printed from the printing device; and
wherein the print job and the printing device firmware are received as a single data transmission.

2. The method as recited in claim 1, further comprising transmitting an indicator with the print job and printing device firmware, the indicator providing notification to the printing device that the transmission includes printing device firmware.

3. The method as recited in claim 1, wherein the printing device firmware transmitted is different from printing device firmware presently resident on the printing device.

4. The method as recited in claim 1, further comprising:
displaying a user prompt providing an option for the user to submit the print job with or without the printing device firmware;
receiving a user response to the prompt; and
transmitting the printing device firmware only in the event that the user response requests that the printing device firmware be transmitted.

5. The method as recited in claim 1, further comprising:
identifying a version of printing device firmware presently resident in the printing device;
determining if the version of printing device firmware presently resident in the printing device is different from the printing device firmware to be transmitted with the print job; and
transmitting the printing device firmware only in the event that the version of printing device firmware presently resident in the printing device is different from the printing device firmware to be transmitted with the print job.

6. The method as recited in claim 1 wherein the printing device firmware further comprises a complete version of printing device firmware.

7. The method as recited in claim 1, wherein the printing device firmware further comprises one or more firmware modules that, when included with printing device firmware presently installed in the printing device produces a different operational version of printing device firmware.

8. A method for use in a printing device, comprising:
receiving a print job;
processing the print job with permanent firmware currently installed in the printing device if no indication is received indicating that the print job should be processed with temporary firmware;
if an indication is received indicating that the print job should be processed with temporary firmware:
loading the temporary firmware;
processing the print job with the temporary firmware;
deleting the temporary firmware after the print job is complete; and
wherein the print job, the temporary firmware and the indication are received as a single data transmission.

9. The method as recited in claim 8, wherein the indication further comprises one or more bits of data included with the print job.

10. or The method as recited in claim 8, wherein the indication further comprises the temporary firmware being included with the print job.

11. The method as recited in claim 8, further comprising receiving the temporary firmware with the print job.

12. The method as recited in claim 8, wherein the firmware further comprises a complete version of firmware for the printing device.

13. The method as recited in claim 8, wherein:
the firmware further comprises one or more firmware modules that constitute a subset of a complete version of firmware for the printing device; and
the loading further comprises loading only the subset of one or more firmware modules.

14. A printing device, comprising:
a permanent firmware module that includes processor-executable instructions for controlling operation of the printing device;
means for receiving a temporary firmware upgrade and one or more print jobs;
a temporary firmware upgrade module configured to load the temporary firmware upgrade into the printing device and remove the temporary firmware upgrade from the printing device;
wherein the temporary firmware upgrade module loads the temporary firmware upgrade prior to processing one or more print jobs designated to use the temporary firmware upgrade and removes the temporary firmware upgrade after the one or more designated print jobs are completed; and
wherein the temporary firmware upgrade and the one or more print jobs are received as a single data transmission.

15. The printing device as recited in claim 14, wherein the temporary firmware upgrade is received with the one or more designated print jobs.

16. The printing device as recited in claim 14, wherein the temporary firmware upgrade module is further configured to determine when a print job is designated to use the temporary firmware upgrade.

17. The printing device as recited in claim 16, wherein the temporary firmware upgrade module is further configured to determine when a print job is designated to use the temporary firmware upgrade by identifying an indicator associated with print jobs that are to designated to use the temporary firmware upgrade.

18. The printing device as recited in claim 16, wherein the temporary firmware upgrade module is further configured to determine when a print job is designated to use the temporary firmware upgrade by being manually enabled prior to receiving the one or more designated print jobs.

19. A computing device, comprising:
a printer driver configured to operate in conjunction with a printing device;
a print job to be printed on the printing device;
means for transmitting the print job to the printing device;
a temporary firmware upgrade that includes one or more firmware modules
a temporary firmware upgrade module configured to transmit the temporary firmware upgrade to the printing device prior to or together with transmitting the print job to the printing device; and
wherein the print job and the temporary firmware upgrade are received as a single data transmission.

20. The computing device as recited in claim 19, further comprising a user interface configured to receive a request to transmit the temporary firmware upgrade with the print job.

21. The computing device as recited in claim 19, wherein the temporary firmware upgrade module is further configured to transmit an indicator to the printing device indicating that the print job is to be processed using the temporary firmware upgrade.

22. The computing device as recited in claim 21, wherein the temporary upgrade module is further configured to transmit the print job, the temporary firmware upgrade and the indicator to the printing device as a print job packet.

23. The computing device as recited in claim 19, wherein:
the temporary firmware upgrade module is further configured to identify a version value associated with permanent firmware loaded into the printing device; and
the temporary firmware upgrade is only transmitted if the version of permanent firmware is different from a version value associated with the temporary firmware upgrade.

24. The computing device as recited in claim 19, wherein the temporary firmware upgrade constitutes a complete version of printing device firmware.

25. One or more computer-readable media containing computer-executable instructions that, when executed on a computer, perform the following steps:
receiving a command to submit a print job to a printing device;
submitting the print job to the printing device;
providing temporary printing device firmware for the printing device to use in processing the print job; and
wherein the print job and the temporary printing device firmware are received as a single data transmission.

26. The one or more computer-readable media as recited in claim 25, further comprising receiving a command to provide the temporary printing device firmware to the printing device.

27. The one or more computer-readable media as recited in claim 25, wherein the temporary printing device firmware is submitted to the printing device together with the print job.

28. The one or more computer-readable media as recited in claim 25, further comprising:
verifying that permanent firmware present in the printing device is different from the temporary printing device firmware; and
providing the temporary printing device firmware only if the permanent firmware is different from the temporary printing device firmware.

29. The one or more computer-readable media as recited in claim 25, further comprising providing an indicator to the printing device notifying the printing device that the temporary firmware upgrade is to be used in processing the print job.

30. The one or more computer-readable media as recited in claim 29, further comprising combining the print job, the temporary firmware upgrade and the indicator into one submission to the printing device.

31. One or more computer-readable media containing computer-executable instructions that, when executed on a computer, perform the following steps:
receiving a print job;
receiving temporary firmware;
loading the temporary firmware;
processing the print job using the temporary firmware;
removing the temporary firmware after processing the print job; and
wherein the print job and the temporary firmware are received in one transmission.

32. The one or more computer-readable media as recited in claim 31, further comprising receiving an indicator that signals the print job is to be processed with the temporary firmware.

33. The one or more computer-readable media as recited in claim 32, wherein the print job, the temporary firmware and the indicator are received in the same submission.

34. The one or more computer-readable media as recited in claim 31, wherein the temporary firmware further comprises a complete version of firmware capable of controlling a printing device.

35. The one or more computer-readable media as recited in claim 31, wherein:
the temporary firmware further comprises a subset of permanent firmware present on a printing device;
the loading further comprises supplementing the permanent firmware with the temporary firmware so that the resultant combination creates a new version of firmware capable of controlling the printing device.

* * * * *

UNITED STATES PATENT AND TRADEMARK OFFICE
CERTIFICATE OF CORRECTION

PATENT NO. : 7,145,682 B2 Page 1 of 1
APPLICATION NO. : 10/324426
DATED : December 5, 2006
INVENTOR(S) : John L. Boldon It is certified that error appears in the above-identified patent and that said Letters Patent is hereby corrected as shown below:

In column 7, line 37, in Claim 6, delete "claim 1" and insert -- claim 1, --, therefor.

In column 7, line 63, in Claim 10, delete "or" before "The".

Signed and Sealed this

Eighteenth Day of August, 2009

David J. Kappos
*Director of the United States Patent and Trademark Office*